United States Patent
Glennon et al.

(10) Patent No.: US 9,988,698 B2
(45) Date of Patent: Jun. 5, 2018

(54) METHOD OF HARDENING ARTICLES AND ARTICLES COMPRISING THE SAME

(71) Applicants: The Abbott Ball Company, West Hartford, CT (US); Puris, LLC, Bruceton Mills, WV (US)

(72) Inventors: Glenn Glennon, West Hartford, CT (US); Eric Bono, McDonald, PA (US)

(73) Assignees: THE ABBOTT BALL COMPANY, West Hartford, CT (US); CARPENTER TECHNOLOGY CORPORATION, Philadelphia, PA (US)

( * ) Notice: Subject to any disclaimer, the term of this patent is extended or adjusted under 35 U.S.C. 154(b) by 49 days.

(21) Appl. No.: 14/566,769

(22) Filed: Dec. 11, 2014

(65) Prior Publication Data

US 2015/0167122 A1 Jun. 18, 2015

Related U.S. Application Data

(60) Provisional application No. 61/915,802, filed on Dec. 13, 2013.

(51) Int. Cl.
| | |
|---|---|
| C22C 19/03 | (2006.01) |
| B32B 15/04 | (2006.01) |
| B32B 37/10 | (2006.01) |
| B32B 37/06 | (2006.01) |
| B32B 15/01 | (2006.01) |
| B05D 7/24 | (2006.01) |
| B05D 3/02 | (2006.01) |
| B05D 7/14 | (2006.01) |
| B23K 20/02 | (2006.01) |
| C23C 28/02 | (2006.01) |
| C23C 26/00 | (2006.01) |
| C23C 30/00 | (2006.01) |
| C22C 19/00 | (2006.01) |
| C23C 24/08 | (2006.01) |

(52) U.S. Cl.
CPC ............ *C22C 19/03* (2013.01); *B23K 20/023* (2013.01); *B32B 15/01* (2013.01); *C22C 19/00* (2013.01); *C22C 19/007* (2013.01); *C23C 24/087* (2013.01); *C23C 26/00* (2013.01); *C23C 28/02* (2013.01); *C23C 28/021* (2013.01); *C23C 30/00* (2013.01); *C23C 30/005* (2013.01); *Y10T 428/12451* (2015.01); *Y10T 428/12472* (2015.01); *Y10T 428/12806* (2015.01); *Y10T 428/12944* (2015.01); *Y10T 428/12993* (2015.01)

(58) Field of Classification Search
CPC ...... Y10T 428/12806; Y10T 428/12944; Y10T 428/12472; Y10T 428/12451; Y10T 428/12993; C23C 24/087; C23C 26/00; C23C 28/021; C23C 28/02; C23C 30/00; C23C 30/005; C22C 19/007; C22C 19/03; C22C 19/00; B32B 15/01; B32B 15/04; B32B 15/043
See application file for complete search history.

(56) References Cited

U.S. PATENT DOCUMENTS

| | | | | |
|---|---|---|---|---|
| 5,039,476 A | * | 8/1991 | Adachi | B22F 9/04 241/5 |
| 6,043,451 A | * | 3/2000 | Julien | C23C 4/02 219/121.43 |
| 6,458,317 B1 | * | 10/2002 | Koskinen | C23C 24/02 419/46 |
| 8,182,741 B1 | | 5/2012 | Dellacorte | |
| 8,377,373 B1 | | 2/2013 | Glennon | |
| 2011/0097236 A1 | * | 4/2011 | Gaydos | B22F 3/15 420/421 |
| 2012/0177527 A1 | * | 7/2012 | Kerrigan | C21D 1/25 419/29 |

\* cited by examiner

Primary Examiner — Michael E. La Villa
(74) Attorney, Agent, or Firm — Cantor Colburn LLP

(57) ABSTRACT

Disclosed herein is a method comprising disposing on a base article a nickel-titanium alloy; where the nickel is in an amount of about 58 to about 62 weight percent and titanium in an amount of about 38 to about 42 wt %, based on the total weight of the nickel-titanium alloy; and applying a pressure of 12 to 20 kilopounds per square inch at a temperature of 1400 to 2100° F. for a period of 1 to 8 hours to form a nickel-titanium alloy coating on the base article. Disclosed is an article comprising a base article; and a nickel-titanium alloy; where the nickel-titanium alloy is disposed on the base article; where the nickel is in an amount of about 58 to about 62 weight percent and titanium in an amount of about 38 to about 42 wt %, based on the total weight of the nickel-titanium alloy.

12 Claims, No Drawings

METHOD OF HARDENING ARTICLES AND ARTICLES COMPRISING THE SAME

CROSS-REFERENCE TO RELATED APPLICATIONS

This disclosure claims the benefit of U.S. provisional application No. 61/915,802 filed on Dec. 13, 2013, the entire contents of which are hereby incorporated by reference.

BACKGROUND

This disclosure relates to a method of hardening articles and to articles manufactured therefrom.

Articles (e.g., shafts, ball bearings, pistons, and the like) that operate in extensive communication with other surfaces undergo abrasion and wear. They also undergo corrosion, which limits their use in certain environments. It is desirable to reduce wear and to improve corrosion resistance of such articles in order to reduce maintenance and replacement costs.

It is therefore desirable to improve the ability of such articles to reduce wear and corrosion in order to improve costs and to reduce maintenance.

SUMMARY

Disclosed herein is a method comprising disposing on a base article a nickel-titanium alloy; where the nickel is in an amount of about 58 to about 62 weight percent and titanium in an amount of about 38 to about 42 wt %, based on the total weight of the nickel-titanium alloy; and applying a pressure of 12 to 20 kilopounds per square inch at a temperature of 1400 to 2100° F. for a period of 1 to 8 hours to form a nickel-titanium alloy coating on the base article.

Disclosed is an article comprising a base article; and a nickel-titanium alloy; where the nickel-titanium alloy is disposed on the base article; where the nickel is in an amount of about 58 to about 62 weight percent and titanium in an amount of about 38 to about 42 wt %, based on the total weight of the nickel-titanium alloy.

DETAILED DESCRIPTION

Disclosed herein are articles having a core manufactured from a first material and a skin (also referred to as a coating) manufactured from a nickel-titanium alloy. The nickel-titanium alloy comprises nickel in an amount of about 58 to about 62 weight percent (wt %) and titanium in an amount of about 38 to about 42 wt %, based on the total weight of the nickel-titanium alloy.

The nickel is about 58 to about 62 wt %, specifically about 59 to about 61 wt %, and more specifically about 59.5 to about 60.5 wt % of the nickel-titanium alloy. An exemplary amount of nickel is about 60 wt % of the nickel-titanium alloy.

The remaining weight of the nickel-titanium alloy is titanium. In an exemplary embodiment, the titanium will be about 38 to about 42 wt %, specifically about 39 to about 41 wt %, and more specifically about 39.5 to about 40.5 wt % of the nickel-titanium alloy. An exemplary amount of titanium is about 40 wt % of the nickel-titanium alloy.

The article may be of any geometrical shape for which a coating of nickel-titanium is desired. The shape may have a cross-sectional area that is a square, a circle, a rectangle, an ellipsoid, a triangle, a polygon (not including a square and a rectangle) that has 4 or more sides. Examples of such articles are ball bearings, axles, shafts for pistons, and the like.

The core (also called the base material) of the article can comprise metals such as iron, nickel, cobalt, copper, tin, antimony, titanium, gold, silver, platinum, or the like, or a combination comprising at least one of the foregoing metals. Alloys such as stainless steel, hastalloy, brass, bronze, aluminum alloys such as Ti—Al alloys, and the like, may also be used in the core. The core can also be a metal, an intermetallic or a ceramic such as a metal oxide, a metal carbide, a metal nitride, a metal oxynitride, a metal boride, a metal silicide, or the like, or a combination comprising at least one of the foregoing ceramics.

Powdered particles of the nickel-titanium alloy are disposed on an outer surface of the article and subjected to high pressures and/or high temperatures to produce a coating of the nickel-titanium alloy on the surface of the article. The particles of the nickel-titanium alloys may be in the form of a powder, flakes, whiskers, fibers, or the like. This method comprises metallurgically or mechanically (or a combination of those two methods) bond two dissimilar metals together to augment a property of the base material. This augmentation is for increased wear or corrosion performance. It would allow, for example, one to put a layer of the nickel-titanium alloy onto a base article that is less expensive and more ductile.

The augmentation layer is applied by consolidating loose powder against the base material (the article or the core). The loose powder is contained by an exterior can, or mold, typically constructed of mild steel. A vacuum of about $1 \times 10^{-1}$ to $1 \times 10^{-5}$ Torr is applied to the interior of a steel can assembly to remove the air and other gases.

The assembly is then hermetically sealed by welding while it is under vacuum. The entire assembly is then Hot Isostatically Pressed (HIP) to consolidate the loose powder against the base material (also called the core). The hot isostatic pressing of the nickel-titanium alloy on the core is conducted at temperatures of 1400 to 2100° F., specifically 1600 to 1900° F. at 12 to 20 kilopounds per square inch, specifically 13 to 16 kilopounds per square inch for 1 to 8 hours, specifically 3 to 4 hours. An exemplary pressure is 15 kilopounds and an exemplary temperature is 1800° F. An exemplary time period is 3 to 4 hours.

Incorporated herein in their entirety are U.S. Pat. No. 8,377,373 and U.S. Pat. No. 8,182,741 to Glennon.

Depending on the characteristics of the base article, it may be necessary to apply a thin layer (<0.005 inches) of a third metal to the surface of the base article to improve the metallurgical bond between the base article and the nickel-titanium alloy. If application of a third metal is not possible an alternate method of improving the strength of the bond is to machine or otherwise impart a surface texture on the base article which mechanically attaches the nickel-titanium alloy to the base material. After the hot isostatic pressing is completed, the exterior can or mold made of mild steel can is removed by either machining or chemical means, or a combination of the two and any finish machining is done.

The coating on the base article increases the hardness of the article to be about 40 to about 62 Rockwell. It is to be noted that the base material is typically in a solid form, although it could be powder as well.

What is claimed is:

1. A method comprising:
disposing on an outer surface of a base article a nickel-titanium alloy; wherein the nickel is in an amount of about 58 to about 62 weight percent and titanium in an amount of about 38 to about 42 wt %, each based on the total weight of the nickel-titanium alloy;

hermetically sealing a can under vacuum, wherein the nickel-titanium alloy is in the form of a loose powder and is disposed between the outer surface of the base article and an inner surface of the hermetically sealed can; and applying a pressure of 12 to 20 kilopounds per square inch at a temperature of 1400 to 2100° F. for a period of 1 to 8 hours to the hermetically sealed can to form a nickel-titanium alloy coating on the base article.

2. The method of claim 1, wherein the base article comprises a metal, an intermetallic compound or a ceramic.

3. The method of claim 1, further comprising disposing the base article and the nickel-titanium alloy in the can.

4. The method of claim 1, further comprising removing the can after the applying of the pressure.

5. The method of claim 1, wherein a surface hardness of the nickel-titanium alloy coating on the base article is 40 to 62 Rockwell.

6. The method of claim 2, wherein the base article comprises a metal, an intermetallic compound or a ceramic.

7. An article comprising:

a base article comprising an outer surface;

a nickel-titanium alloy disposed on the outer surface of the base article; and a hermetically sealed can under vacuum containing the nickel-titanium alloy and the base article, wherein the nickel-titanium alloy is in the form of a loose powder and is disposed between the outer surface of the base article and an inner surface of the hermetically sealed can, and wherein the nickel is in an amount of about 58 to about 62 weight percent and titanium is in an amount of about 38 to about 42 weight percent, each based on the total weight of the nickel-titanium alloy.

8. The article of claim 7, wherein the base article comprises a metal, an intermetallic compound, or a ceramic.

9. The article of claim 7, wherein the outer surface of the base article is textured prior to a deposition of the nickel-titanium alloy.

10. The article of claim 7, further comprising a coating disposed between the base article and the nickel-titanium alloy.

11. The article of claim 7, wherein the hermetically sealed can comprises mild steel.

12. The article of claim 7, wherein the hermetically sealed can is under a vacuum of $1\times10^{-1}$ to $1\times10^{-5}$ Torr.

* * * * *